US012535955B2

United States Patent
Zafar et al.

(10) Patent No.: US 12,535,955 B2
(45) Date of Patent: Jan. 27, 2026

(54) METHOD AND ELECTRONIC DEVICE FOR SECURE ON-DEVICE STORAGE FOR MACHINE LEARNING MODELS

(71) Applicant: SAMSUNG ELECTRONICS CO., LTD., Suwon-si (KR)

(72) Inventors: Aarif Zafar, Howrah (IN); Renju Chirakarotu Nair, Bangalore (IN); Nikhil Sahni, Bangalore (IN); Sagar Mahesh Maliye, Mumbai (IN); Aditya Jhawar, Howrah (IN); Rajesh Kumar Panda, Ganjam (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/228,354

(22) Filed: Jul. 31, 2023

(65) Prior Publication Data

US 2024/0152283 A1    May 9, 2024

Related U.S. Application Data

(63) Continuation of application No. PCT/KR2023/010396, filed on Jul. 19, 2023.

(30) Foreign Application Priority Data

Nov. 9, 2022  (IN) .............................. 202241064024

(51) Int. Cl.
G06F 3/06      (2006.01)
G06N 5/04     (2023.01)
(52) U.S. Cl.
CPC ............ *G06F 3/062* (2013.01); *G06F 3/0655* (2013.01); *G06F 3/0673* (2013.01); *G06N 5/04* (2013.01)

(58) Field of Classification Search
CPC ......... G06N 5/04; G06F 3/062; G06F 3/0655; G06F 3/0673
See application file for complete search history.

(56) References Cited

U.S. PATENT DOCUMENTS 10,148,677 B2   12/2018   Muddu et al.
11,403,540 B2    8/2022   Sanketi et al.
(Continued)

FOREIGN PATENT DOCUMENTS

CN         113939848 A       1/2022
JP       2021-177428 A      11/2021
(Continued)

OTHER PUBLICATIONS

Iwata, et al, "Component Data Management Method, Component Data Management Device, and Component Data Management Program", Jun. 16, 2021, WO 2022/264835 A1 (Fit English Translation), pp. 1-81 (Year: 2021).*

(Continued)

*Primary Examiner* — Jonathan A Bui
(74) *Attorney, Agent, or Firm* — Sughrue Mion, PLLC (57) ABSTRACT

A method for performing an inference includes: detecting a context among at least one context associated with at least one application; triggering a model execution command to a smart agent of an electronic device, based on the detected context; loading a machine learning (ML) model into a secure storage of the electronic device, based on the detected context and the triggered model execution command; generating, using the loaded ML model, an inference, based on data associated with the detected context; and sharing the generated inference with each application of the at least one application that is registered for the detected context.

18 Claims, 6 Drawing Sheets

(56) References Cited

U.S. PATENT DOCUMENTS

| | | | |
|---|---|---|---|
| 11,704,577 B1* | 7/2023 | Chen | G06N 3/082 |
| | | | 706/12 |
| 2019/0156247 A1* | 5/2019 | Faulhaber, Jr. | G06N 3/045 |
| 2019/0163667 A1* | 5/2019 | Feuz | G06F 9/547 |
| 2020/0005135 A1 | 1/2020 | Che | |
| 2020/0175423 A1* | 6/2020 | Keech | G06F 8/436 |
| 2021/0004696 A1* | 1/2021 | Lin | G06F 21/602 |
| 2021/0081836 A1 | 3/2021 | Polleri et al. | |
| 2021/0117859 A1* | 4/2021 | Rogers | H04L 41/082 |
| 2021/0158165 A1* | 5/2021 | Liu | G06N 3/045 |
| 2022/0004929 A1 | 1/2022 | Sanketi et al. | |
| 2022/0101200 A1 | 3/2022 | Feuz et al. | |
| 2022/0201009 A1 | 6/2022 | Dhoble et al. | |
| 2022/0318656 A1 | 10/2022 | Liu et al. | |
| 2022/0351041 A1 | 11/2022 | Lee et al. | |
| 2022/0358385 A1 | 11/2022 | Sanketi et al. | |
| 2022/0358749 A1 | 11/2022 | Yonetani et al. | |
| 2023/0261868 A1* | 8/2023 | Nakai | H04L 9/0637 |
| | | | 713/155 |
| 2023/0315877 A1* | 10/2023 | McMillon | G06F 21/6209 |
| | | | 726/27 |

FOREIGN PATENT DOCUMENTS

| | | | | |
|---|---|---|---|---|
| KR | 10-2467009 B1 | 11/2022 | | |
| WO | WO-2020005806 A1 * | 1/2020 | | G06F 8/65 |
| WO | 2022/030669 A1 | 2/2022 | | |

OTHER PUBLICATIONS

"An Execution Method and Device of Security Script Container Facing to Deep Learning", Jun. 17, 2021, CN 115080185 A (Fit English Translation), pp. 1-16 (Year: 2021).*

International Search Report and Written Opinion issued Oct. 18, 2023 by the International Searching Authority in International Patent Application No. PCT/KR2023/010396. (PCT/ISA/220, PCT/ISA/210 and PCT/ISA/237).

Communication dated Jul. 21, 2025, issued by the European Patent Office in European Application No. 23888849.9.

Communication dated Jul. 4, 2025 issued by the Indian Patent Office in Indian Patent Application No. 202241064024.

* cited by examiner

METHOD AND ELECTRONIC DEVICE FOR SECURE ON-DEVICE STORAGE FOR MACHINE LEARNING MODELS

CROSS-REFERENCE TO RELATED APPLICATION(S)

This application is a bypass continuation of PCT International Application No. PCT/KR2023/010396, filed on Jul. 19, 2023, which claims priority to Indian Patent Application No. 202241064024, filed on Nov. 9, 2022, in the Indian Patent Office, the disclosures of which are incorporated by reference herein in their entireties.

BACKGROUND

1. Field

The disclosure relates to a method and an electronic device for securing on-device storage for machine learning models, and more specifically to a method and an electronic device for generating an inference by loading a machine learning model in a secured on-device storage based on one or more contexts of one or more applications on the electronic device.

2. Description of Related Art

Machine Learning (ML) models are becoming an intrinsic part of applications being used by users. Additionally, users require access to a plurality of applications from a device to meet the demand of ever-increasing dynamic requirements. Therefore, there is a need for on-device deployment of the ML models to support the plurality of applications for many use cases involving an inference based on users' sensitive data, so as not to export such data to servers. In general, an inference is an outcome or output generated by one or more ML models based on input data associated with a device, and/or user. The device (e.g., a computing device) or a application on the device uses inference(s) to perform any type of task or service of the application. In addition, contextual inference and training need on-device execution of ML models.

The security of ML models and users' data becomes a big concern when deploying ML models to user devices. To overcome the security concerns, many solutions have been proposed which mainly depend on encryption/authentication techniques that add overhead with execution times. Further, the introduction of ML models in on-device applications is causing the size of the application installer (e.g., .apk file) to be ever-increasing, and requires frequent updates on such ML models. Also, multiple applications running on-device may use the same ML model, or the same inputs and same events for inference generations. Although the same inference is required by multiple applications from the same ML model, the multiple applications call the same ML model in different instances. Therefore, the computational redundancy increases with an increase in the number of applications using ML models.

Multiple ML models perform contextual inference that involves redundant processes of listening to context from the same event, collecting the same input data, etc. Further, the ML models may also need frequent updates which cause frequent updates to the application. By the time the ML model is deployed to end user devices (e.g., as an on-device ML model) with an application package, any update to the ML model requires a mandatory update to the application package. The ML model lifecycle for the on-device ML models includes multiple redundancy execution, security concerns, and frequent updating overhead.

SUMMARY

Provided are a method and an electronic device for generating an inference by loading a machine learning model in a secured on-device storage on a device. The method and system may load the machine learning model and generate the inference based on one or more contexts of one or more applications.

According to an aspect of the disclosure, there is provided a method for performing an inference, the method may include detecting a context among at least one context associated with at least one application. The method may include triggering a model execution command to a smart agent of an electronic device, based on the detected context. The method may include loading a machine learning (ML) model into a secure storage of the electronic device, based on the detected context and the triggered model execution command. The method may include generating, using the loaded ML model, an inference, based on data associated with the detected context. The method may include sharing the generated inference with each application of the at least one application that is registered for the detected context.

According to an aspect of the disclosure, there is provided an electronic device for performing an inference. The electronic device may include a smart agent, a secure storage, a memory storing at least one instruction, and at least one processor. The at least one processor is configured to execute the at least one instruction to detect a context among at least one context associated with at least one application. The at least one processor is configured to execute the at least one instruction to trigger a model execution command to the smart agent based on the detected context. The at least one processor is configured to execute the at least one instruction to load, by the smart agent a machine learning (ML) model into the secure storage based on the detected context and the triggered model execution command. The at least one processor is configured to execute the at least one instruction to generate, by the smart agent using the loaded ML model, an inference in the secure environment based on data associated with the detected context. The at least one processor is configured to execute the at least one instruction to share, by the smart agent, the generated inference with each of the at least one application that is registered for the detected context.

According to an aspect of the disclosure, there is provided a computer-readable storage medium storing at least one instruction which, when executed by at least one processor, causes the at least one processor to execute a method including: detecting a context among at least one context associated with at least one application; triggering a model execution command to a smart agent of an electronic device, based on the detected context; loading a machine learning (ML) model into a secure storage of the electronic device, based on the detected context and the triggered model execution command; generating, using the loaded ML model, an inference, based on data associated with the detected context; and sharing the generated inference with each application of the at least one application that is registered for the detected context.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It should be appreciated that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

The term "some" or "one or more" as used herein is defined as "one", "more than one", or "all." Accordingly, the terms "more than one," "one or more" or "all" would all fall under the definition of "some" or "one or more". The term "an embodiment", "another embodiment", "some embodiments", or "in one or more embodiments" may refer to one embodiment or several embodiments, or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents. The phrase "exemplary" may refer to an example.

More specifically, any terms used herein such as but not limited to "includes," "comprises," "has," "consists," "have" and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include.".

Whether or not a certain feature or element was limited to being used only once, either way, it may still be referred to as "one or more features", "one or more elements", "at least one feature", or "at least one element." Furthermore, the use of the terms "one or more" or "at least one" feature or element does NOT preclude there being none of that feature or element unless otherwise specified by limiting language such as "there NEEDS to be one or more" or "one or more element is required."

Unless otherwise defined, all terms, and especially any technical and/or scientific terms, used herein may be taken to have the same meaning as commonly understood by one having ordinary skill in the art.

Hereinafter, embodiments of the disclosure will be described in detail with reference to the accompanying drawings, where similar reference characters denote corresponding features consistently throughout.

Figure 1:
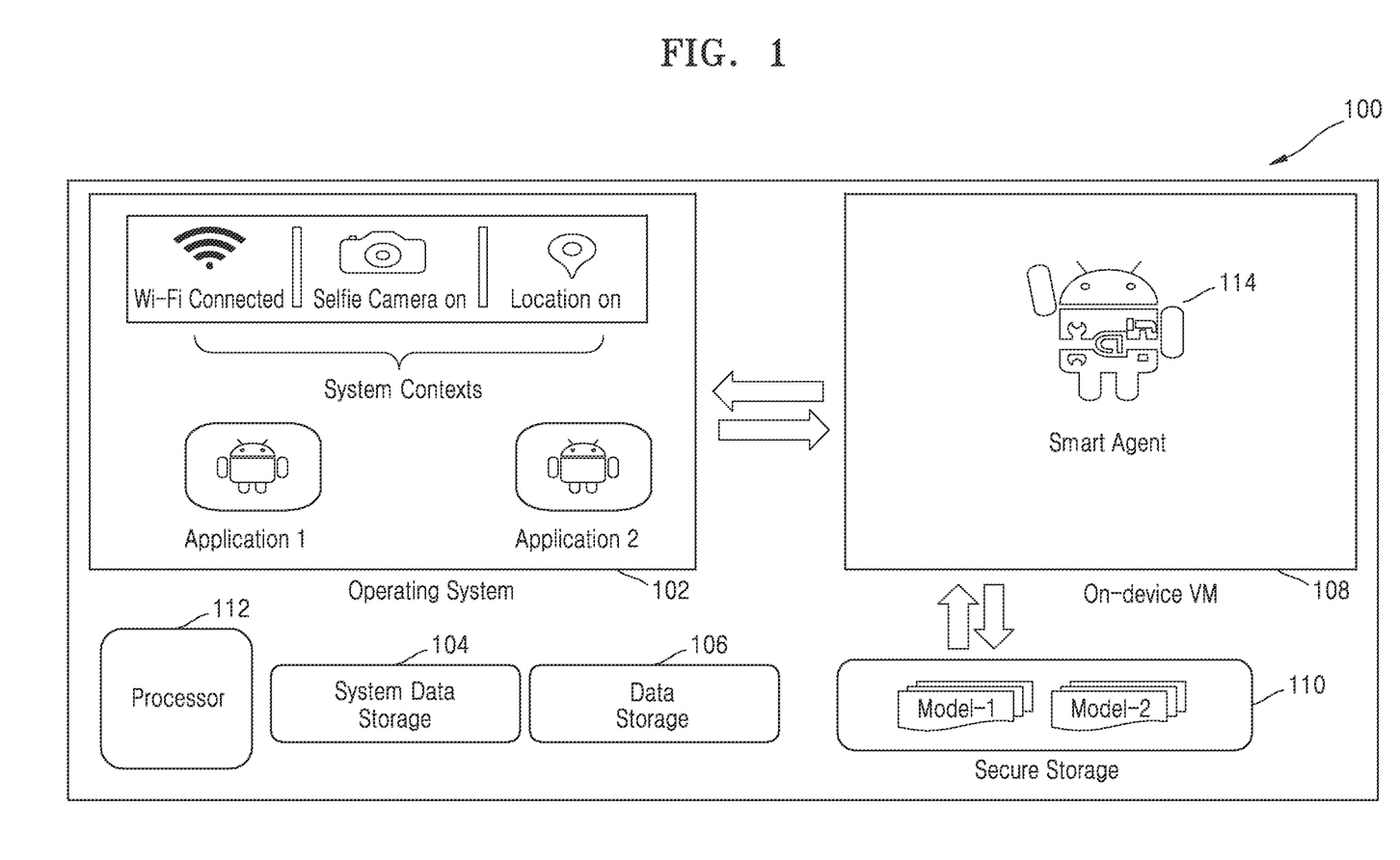
FIG. 1 illustrates a device for generating an inference, according to an embodiment.

FIG. 1 illustrates an electronic device for generating an inference, according to an embodiment. The electronic device 100 may include an operating system (OS) 102, an on-device Virtual Machine (VM) 108, a system data storage 104, a data storage 106, a secure storage 110, and a processor 112. For example, the electronic device 100 may be a smartphone, other mobile devices, a laptop, a tablet, etc.

The OS 102 may be an interface between the user and the device hardware. The OS 102 may initialize all hardware components of the device 100 after being initially loaded by a bootstrap program at the time of switching on the electronic device 100. Further, the OS 102 may perform all basic tasks of the electronic device 100, such as process management, memory management, handling input/output, access to the user applications, and managing a plurality of contexts or system contexts, etc. For example, the OS 102 may be an Android OS, a Windows OS, a Linux OS, an iOS, etc. The plurality of contexts or system contexts of the OS 102 may include, but is not exclusively limited to, a connected WiFi, a selfie camera in an ON state, and an enabled location service. In an exemplary embodiment, the WiFi module of electronic device 100 may receive nearby WiFi signals. The electronic device 100 thereby may connect with the WiFi signal upon successful verification. Once the electronic device 100 is successfully connected with the WiFi signal, the OS 102 may determine the system context of "WiFi connected".

In an exemplary embodiment, the camera of electronic device 100 may capture a scene in the field of view of the camera and displays the scene via a user display of the electronic device 100. The camera may be a selfie camera or a back camera of the electronic device 100. When the user starts the selfie camera to capture any image, the OS 102 may receive the system context as "selfie camera on".

In an exemplary embodiment, a Global Positioning System (GPS) tracker of the electronic device 100 may determine the current position/location of the electronic device 100 based on the positioning of the electronic device 100. When the GPS tracker is in an active state to determine any new location, the OS 102 may receive the system context as "location on" upon determining a new location from the GPS tracker.

In an exemplary embodiment, the OS 102 may include one or more applications to cater to the need of the user. The one or more applications may be related to banking applications, games applications, email applications, image/video editing applications, etc.

The on-device VM 108 may be a computer file or software module, typically known as an image, that behaves like a normal computer. A non-limiting example of the on-device VM may be a MicroDroid. The on-device VM 108 may be not running a standalone OS but rather offer an isolated execution environment for running a portion of any application with stronger confidentiality and integrity guaranteed than any OS can provide. The on-device VM 108 may be utilized to create a macro for automatically executing repetitive tasks.

In an embodiment, the on-device VM 108 may include a smart agent 114 for identifying and executing the task. The smart agent 114 of the on-device VM 108 may correspond to a custom virtual machine that executes a specific set of instructions continuously within the device working as a server module for monitoring the on-device tasks and executing necessary steps to fulfill user requirements. The smart agent 114 is not limited to its name, and may be a virtual machine that performs an operation according to an embodiment of the disclosure.

In an embodiment, the smart agent 114 may be configured to communicate with the OS 102 to receive the one or more contexts associated with the one or more applications of the OS 102. In addition, the smart agent 114 may communicate with the secure storage 110 of the electronic device 100. The secure storage 110 may be a part of the memory unit of the electronic device 100 that can only be accessed by the smart agent 114 exclusively.

In an embodiment, the smart agent 114 may accesses the secure storage 110 for loading one or more ML (machine learning) models (e.g., model 1, model 2) based on the received contexts or system contexts from the OS 102. The one or more ML models may be related to identifying objects in images/videos captured by the camera, controlling background processes to be executed based on initiating a connection with any pre-defined WiFi, etc. Subsequently, the smart agent 114 may generate the inference utilizing the one or more ML models in the secure storage 110 based on data associated with the detected context.

In an embodiment, the smart agent 114 may be configured to receive the inference generated by the one or more ML models from the secure storage 110 and share or transmit the inference to the one or more applications of the OS 102. In an embodiment, the one or more contexts may correspond to pre-registered contexts. Once the one or more contexts are registered, then the processor 112 may detect whether any context of the one or more pre-registered contexts is in active status. Upon detecting the context, the smart agent 114 may load the corresponding ML model and generate inference with respect to the data associated with the context.

The secure storage 110 may be a storage space only used for loading the ML models as required by the smart agent 114 of the on-device VM 108. The smart agent 114 may manage the ML models efficiently in the secure storage 110, in which the secure storage 110 may provide isolated protected storage for the loaded ML models. In addition, the smart agent 114 may store the ML models in the secure storage 110 without performing any encryption on the data or models. Thus, the secure storage 110 may eliminate the requirement for encryption or decryption, as the ML models in the secure storage 110 are only accessed by the smart agent 114.

The data storage 106 may store data and information required for processing any task or job by the electronic device 100. The data storage 106 may store a plurality of instructions for being executed by the processor 112. In addition, the data storage 106 may include temporary data, user data, intermediate data, etc. for processing by the processor 112 or by the ML models. Further, the system data storage 104 may include data relating to the system, such as application executables, OS executables, etc.

The system data storage 104, the data storage 106, and the secure storage 110 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The processor 112 of the electronic device 100 may be a central processing unit (CPU). In an embodiment, the processor 112 may be one or more general processors, digital signal processors, application-specific integrated circuits, field-programmable gate arrays, servers, networks, digital circuits, analog circuits, combinations thereof, or other now-known or later-developed devices for analyzing and processing data. The processor 112 may implement a software program, such as code generated manually (e.g., programmed). The processor 112 of the electronic device 100 may be configured to detect a context among one or more contexts associated with the one or more applications of the OS 102.

In an embodiment of the disclosure, the processor 112 may trigger a model execution command to the smart agent 114 for generating the inference relating to the detected context. For example, a user initiates an application X of the OS 102 to turn on the selfie camera for capturing images or videos. Upon turning on the selfie camera, the processor 112 may detect the context of an on state of the selfie camera associated with the application X of the OS 102. Thereafter, the processor 112 may trigger a model execution command to the smart agent 114 for generating "object detection" inference in the captured image or videos in the selfie camera. Accordingly, the smart agent 114 may load the required ML model Z in the secure data storage 106 for generating said inference "object detection" from the data associated with the context "selfie camera on". In an embodiment of the disclosure, the ML model Z may generate the inference of detecting the object from the captured images or videos. Consequently, the smart agent 114 may receive the generated inference from the ML model Z and share the inference with the application X or any new application Y of the OS 102.

Figure 2:
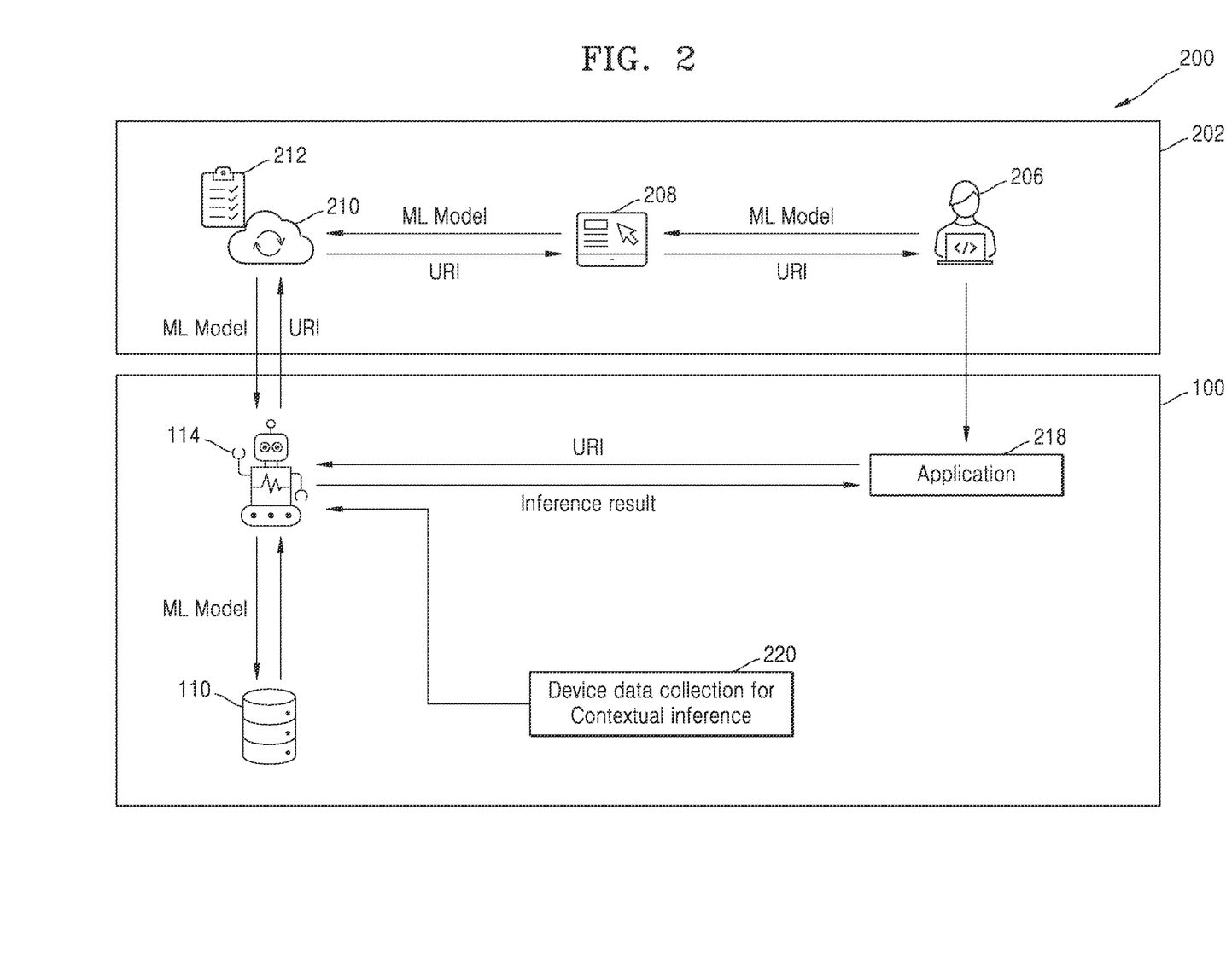
FIG. 2 illustrates an operation flow of an ML model in a system with respect to an on-device environment and a server-side environment, according to an embodiment.

FIG. 2 illustrates an operation flow of an ML model in the system with respect to an on-device environment and a server-side environment, according to an embodiment. FIG. 2 illustrates the operation 200 of the ML model between the electronic device 100 and the server-side environment 202.

In the server-side environment 202, a third-party developer 206 may develop an ML model in order to provide a solution to a user requirement. Upon developing the ML model, the third-party developer 206 uploads the ML model to a secure cloud server 210 via a web portal 208. The web portal 208 may perform as a gateway to upload the ML model into the secure cloud server 210, which in return generate a uniform resource identifier (URI) against the uploaded ML model. Further, the generated URI may be transmitted to the third-party developer 206 via the web portal 208. The secure cloud server 210 may generate metadata associated with the ML model and attach the URI with the generated metadata for identification of the ML model. The URI is a unique identifier identifying the uploaded ML model, and such URI may be used by the third-party developer 206 or any user for fetching the metadata of the associated ML model in the electronic device 100. In an embodiment, the metadata of the ML model may be appended with user credentials/signatures for access control and store as a paired list 212 of the URI and credentials (e.g., user ID) of the user of the device. The paired list 212 may be registered based on the authentication of the valid user at the time of a first usage of the ML model from the secure cloud server 210. Upon registering the paired list 212, the ML model can be accessed automatically for subsequent usage by the same user. The secure cloud server 210 may also optimize the ML model for faster execution within the electronic device 100 while loaded.

In an embodiment, the electronic device 100 may include one or more applications 218, a smart agent 114, a secure storage 110, and a data collection module 220. The third-party developer 206 may transmit the URI received from the secure cloud server 210 to the application 218. The application 218 may utilize the URI to receive the ML model via the smart agent 114 from the secure cloud server 210. The application 218 may transmit the URI received by the third party to the smart agent 114. Upon receiving the URI details, the smart agent 114 may load the ML model from the secure cloud server 210 into the secure storage 110. As the smart agent 114 dynamically loads the ML model in the secure storage 110 using the URI based on the detected contextual information, the electronic device 100 does not require updating the ML modules as and when new versions of the ML models are available in the secure cloud server 210.

The data collection module 220 may collect contextual data from the device and also provides contextual data to the smart agent 114 for generating contextual inference utilizing the loaded ML model. Further, the smart agent 114 may transmit the generated inference to the application 218 for further processing.

In an embodiment of the disclosure, the plurality of applications may require inference results from the ML model based on pre-registered events or macros. Based on the detected context, the smart agent 114 may load the ML model to generate the inference result and thereby broadcast the result to the one or more applications. Further, the smart agent 114 which of the one or more applications to broadcast the inference result to. Thus, the redundancy of generating the same inference result is eliminated and the same inference result is broadcasted to the one or more applications for executing the pre-registered events or macros. The generated inference may include contextual inference for the same set of ML models, events, and input data for which the one or more applications are registered. For a non-limiting example, the smart agent 114 may use a unique set of trigger events the, an ML model (m), and an input data type (n) to determine all the applications with whom the results should be broadcasted. The applications registered for a particular set of {e, m, n} will get the same inference result via broadcast. In this case, when a context is triggered by a particular event e, the smart agent 114 may load the ML model m to generate the inference result. Further, the generated inference result with input data n may be shared with all the applications registered with the particular set {e, m, n}.

Figure 3:
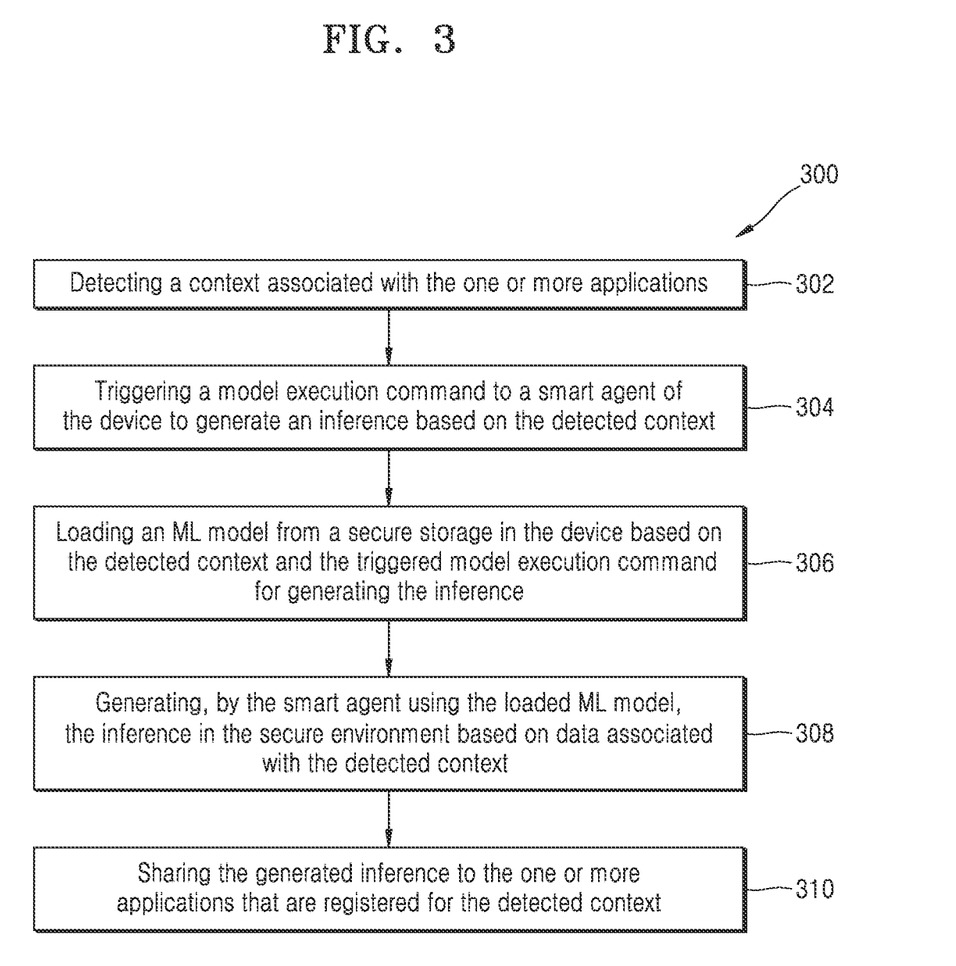
FIG. 3 illustrates a flow chart of a method for performing an inference task for one or more applications in a device, according to an embodiment.

FIG. 3 illustrates a flow chart of a method for performing an inference task for one or more applications in an electronic device, according to an embodiment.

At operation 302, the method 300 includes detecting a context associated with one or more applications of the OS 102. The context among one or more contexts associated with one or more applications is detected by the processor 112 of the electronic device 100. In an embodiment, the detection of the context may be based on pre-registered events or macros only. Once the one or more contexts are registered, the processor 112 checks continuously to detect the context of the one or more pre-registered contexts. For example, the context of an on state of the selfie camera may be pre-registered by a user for detecting objects within captured images or videos by the selfie camera. Thus, once the selfie camera is switched on by the corresponding application, the processor 112 may detect the context of the "selfie camera on".

At operation 304, the method 300 includes triggering a model execution command to a smart agent 114 of the electronic device 100 to generate an inference based on the detected context by the at least one processor 112. The model execution command includes the type of inference required by the application for that pre-registered context. The processor 112 triggers the model execution command along with the input data relating to the detected context to the smart agent 114 of the on-device VM 108 for generating the inference. The input data relates to the information captured upon detecting the pre-registered context. For example, the input data may relate to the current location details of the electronic device 100 at the time of detecting the pre-registered context of "location on" by the processor.

At operation 306, the method 300 includes loading an ML model by the smart agent 114 into the secure storage 110 of the electronic device 100 based on the detected context and the triggered model execution command for generating the inference. As an example, the smart agent 114 of the on-device VM 108 loads the ML model from the secure cloud server 210 into a secure environment, e.g., the secure storage 110 of the electronic device 100. For loading the ML model, the smart agent 114 initially determines the URI based on the triggered model execution command and the input data of the detected context. Upon determining the UM, the smart agent 114 may transmit the URI to the secure cloud server 210. Subsequently, the smart agent 114 mounts the secure storage 110 for loading the ML model of the corresponding UM. The smart agent 114 loads the ML model for generating the inference of the detected context. In an embodiment, the smart agent 114 mounts a secure partition of the secure storage 110 for loading the ML model of the corresponding URI.

In an embodiment, the smart agent 114 may fetch metadata associated with the ML model corresponding to the URI from the secure cloud server 210. The metadata includes the URI for identification of the ML model. The smart agent 114 may also store the fetched metadata of the ML model in the mounted secure storage 110 without performing any encryption technique. The secure storage 110 corresponds to an isolated memory location. The secure storage 110 is mounted in such a way that only the smart agent 114 accesses the secure storage 110 for loading and storing the ML model to generate the inference. The inclusion of the restriction in accessing the ML model on components other than the smart agent 114 eliminates the overhead of the encryption and decryption of the ML model or data in the electronic device 100.

At operation 308, the method 300 includes generating the inference in the secure environment based on data associated with the detected context. The inference is generated by the smart agent 114 based on the loaded ML in the secure storage 110. The ML model receives the input data from the smart agent 114 relating to the detected context and generates a corresponding inference value. For example, the ML model may receive input data from captured image or video for the context of "on state of the selfie camera", and thereby generate inference of detected object within the captured image or video. In an exemplary embodiment, the ML model may receive input data of a new location for the context "enabled location service" of the device and thereby generate inference of probable weather conditions in the next few hours or days.

In an embodiment, the smart agent 114 may convert the data associated with the detected context into a specific data type format and shape that are compatible with the ML model to be loaded. The smart agent 114 receives the accepted data type format and shape from the metadata of the ML model and thereby converts the input data of the context into the corresponding format of the ML model. Upon converting the input data, the smart agent 114 transmits the data to the ML model loaded in the secure storage 110. Thereby, the smart agent 114 generates the inference based on the loaded ML model utilizing converted input data in the secure environment.

The method 300 further includes unmounting the secure storage 110 after generating the inference using the loaded ML model. Once the secure storage 110 is unmounted, the smart agent 114 is unable to access the ML model. For any subsequent access of the earlier loaded ML model, the smart agent 114 may require mounting the secure storage 110 with the ML model again for generating inference with detected context. Therefore, the ML model loaded in the secure storage 110 cannot be accessed by the smart agent 114 once the secure storage 110 is unmounted by the smart agent 114.

At operation 310, the method 300 includes sharing the generated inference to the one or more applications by the smart agent 114. The smart agent 114 shares the generated inference with the one or more applications that are registered for the detected context. Further, the smart agent 114 may share the inference to multiple applications at a time. Therefore, multiple applications may receive the same inference from the smart agent 114. Thus, the smart agent 114 eliminates redundant operations for generating multiple inference values for multiple applications.

In an embodiment, the method 300 includes receiving one or more requests for sharing the inference from the one or more applications. For example, the smart agent 114 may receive one or more requests for sharing the inference from one or more applications, where each request may be associated with an application and each application may be associated with one or more requests. In an embodiment, the smart agent 114 may receive one or more requests for sharing the inference from each application in a subset of the one or more applications. Upon receiving the one or more requests, the method 300 includes validating the one or more received requests by the smart agent 114. The method 300 includes sharing the generated inference by the smart agent to the one or more applications based on the validation. The validation may be based on a user authentication. The validation of the one or more received requests may be also based on access rights of the one or more applications with reference to a pre-registered validation policy. The validation policy may include the access rights of any application based on user profile or age.

Figure 4:
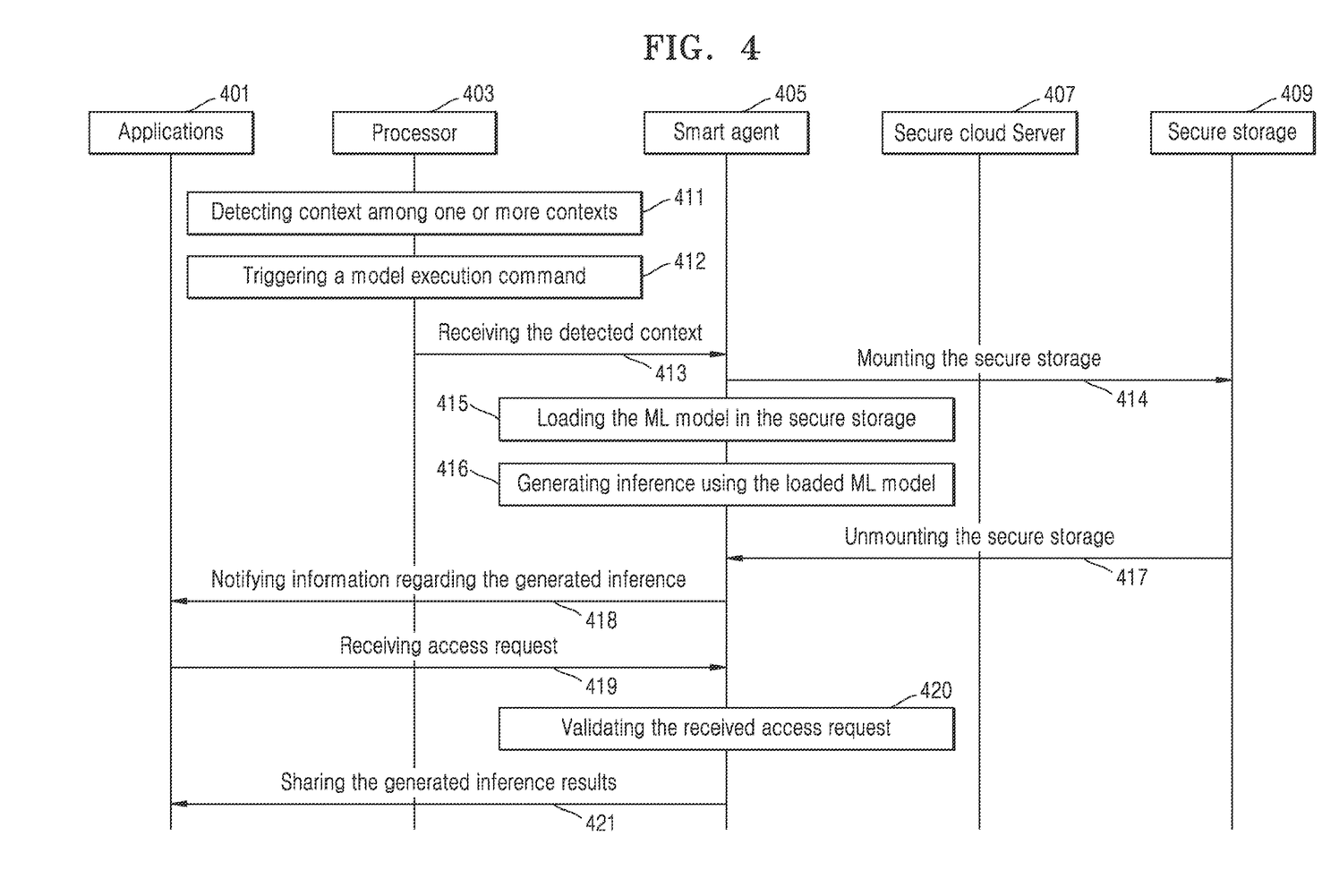
FIG. 4 illustrates a line diagram of performing an inference task for one or more applications in a device, according to an embodiment.

FIG. 4 illustrates a line diagram of performing an inference task for one or more applications in an electronic device, according to an embodiment.

FIG. 4 depicts communication between one or more applications 401, a processor 403, a smart agent 405, a secure cloud server 407, and a secure storage 409 of a device. At operation 411 of FIG. 4, the processor 403 is configured for detecting a context among one or more contexts corresponding to the one or more applications 401. The processor 403 may detect only those contexts which are pre-registered. Therefore, according to the pre-registered contexts in the device, the processor 403 continuously monitors for detecting the one or more contexts corresponding to the one or more applications 401.

Upon detecting the context, at operation 412 of FIG. 4, the processor 403 triggers a model execution command to the smart agent 405 based on the detected context. At operation 413 of FIG. 4, the smart agent 405 receives the detected context along with input data corresponding to the detected context, from the processor 403. Subsequently, the smart agent may determine the corresponding ML model to be mounted in the secure storage 409 for generating the inference. Thereby, the smart agent 405 may transmit a URI of the ML model to the secure cloud server 407. Further, the smart agent 405, at operation 414 of FIG. 4, mounts the secure storage 409 for loading the ML model from the secure cloud server 407 corresponding to the transmitted URI. The secure storage 409 is an isolated data storage in the device, wherein the smart agent 405 only accesses the secure storage 409. Further, during the mounting of the secure storage 409, a system-level policy of the device is applied, such that only a pre-defined smart agent can mount the secure storage 409 or partition. Consequently, the smart agent 405, at operation 415 of FIG. 4, may load the ML model in the secure storage 409 of the device without encrypting the ML model.

The smart agent 405, at operation 416 of FIG. 4, generates an inference using the loaded ML model in the secure environment, e.g., within the mounted secure storage 409. The inference is generated by using the input data corresponding to the detected context of the application. Upon generating the inference, the secure storage 409 is unmounted, at operation 417 of FIG. 4, by the smart agent 405. Once the inference is generated, the smart agent 405 notifies, at operation 418 of FIG. 4, information regarding the generated inference to the application 401 corresponding to the detected context. Subsequently, at operation 419 of FIG. 4, the smart agent 405 receives an access request from the corresponding one or more applications 401 for the generated inference. Further, at operation 420 of FIG. 4, the smart agent 405 validates the received access request of the corresponding one or more applications against a pre-registered policy. The pre-registered policy defines the access rights of the applications with respect to the generated inference value. If the validation is successful, then at operation 421 of FIG. 4, the smart agent 405 shares the generated inference with the corresponding application 401. If the validation fails, the smart agent 405 denies access to the application 401 for accessing the generated inference results and sends an error message to the application 401. The smart agent 405 validates each and every access request from the one or more applications 401. Based on the validation outcome, the smart agent 405 either share the inference result or sends an error message to the application.

Figure 5:
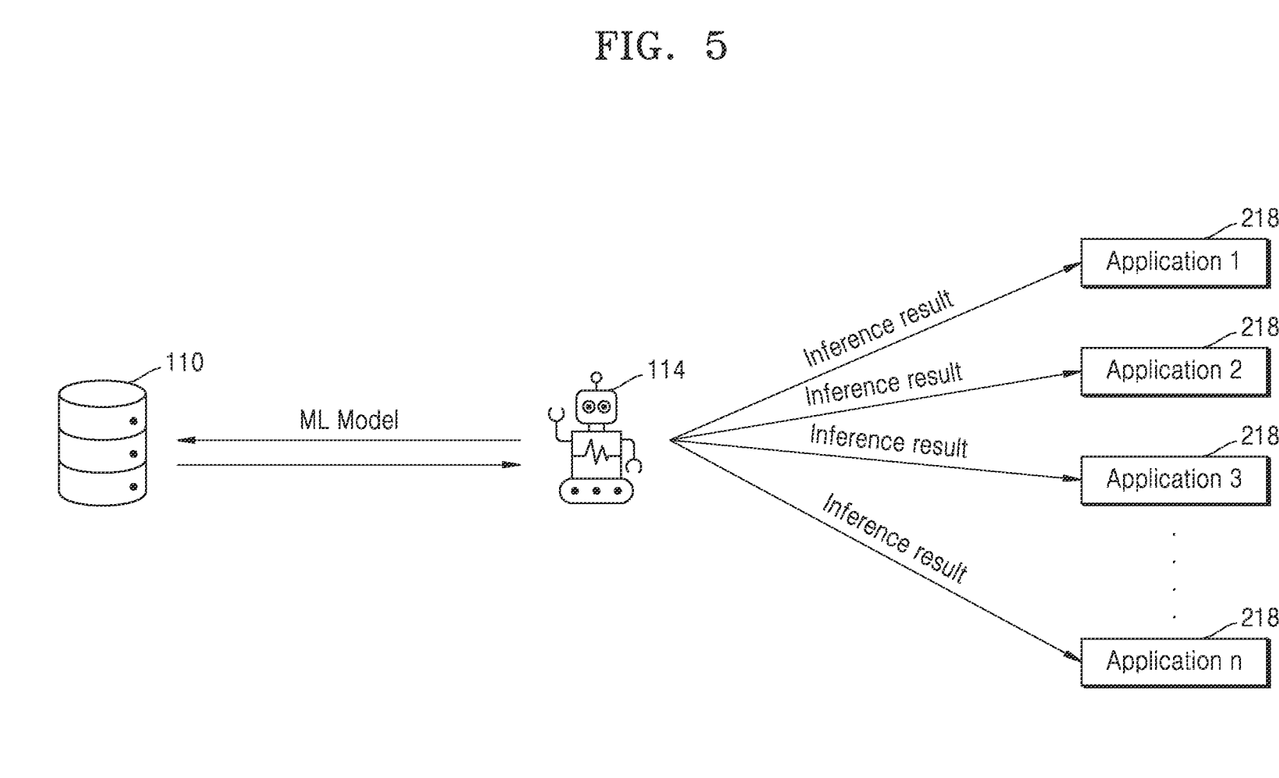
FIG. 5 illustrates an example use case of sharing an inference to one or more applications in parallel by a smart agent, according to an embodiment.

FIG. 5 illustrates an example use case of sharing an inference to one or more applications in parallel by a smart agent, according to an embodiment. A context in the electronic device 100 may be utilized by different applications of different customers. Therefore, once the context is generated, such context may be detected by the processor 112 of the electronic device 100. Upon detecting the context, the smart agent 114 loads the ML model into the secure storage 110 of the electronic device 100. The smart agent 114 further generates inference using the loaded ML model and shares the inference results with the one or more applications 218 of the corresponding customers. Therefore, the customer does not require to send the context manually. The smart agent 114 may receive input data relating to the detected context and thereby transmit the inference results to one or more applications 218. For example, a context of "image click" is pre-registered. Further, an image captured by the "image click" context is utilized by one or more applications: A, B, and C of different users X, Y, and Z of the device. Once the "image click" context is detected, the input data of the captured image is utilized by the smart agent 114 to generate inference. Subsequently, the smart agent 114 transmits the generated inference to the one or more applications A, B, and C used by the different users X, Y, and Z. Thus, the transmission of real-time input data by the user to the ML model is not required, only generation of context is enough to receive the inference result from the smart agent 114.

Referring now to technical abilities and effects of the method and system disclosed herein, the disclosure may provide at least the following technical advantages over the related art: a) eliminating overhead of encryption and decryption for loading an ML model; b) not requiring continuous update to an on-device ML model; and c) eliminating manual input data transfer to an ML model, and redundant computation of the same input data by the ML model. For example, utilization of the secure storage 110 in the electronic device 100 to load the ML model eliminates the overhead of encryption and decryption for loading the ML model. The smart agent 114 has only access right to the secure storage 110, therefore no third-party module/device can access the secure storage 110 to retrieve the users' sensitive data. In an embodiment, the smart agent 114 may utilize the URI to load the ML model in the secure storage 110 dynamically. Hence, continuous on-device update on the ML model is not required. In an embodiment, one or more applications receive an inference generated from a smart agent 114 in parallel based on auto-detection of the context. Therefore, manual input data transfer to the ML model for generating any inference is eliminated, and redundant computation of the same input data by the ML model from one or more applications is also eliminated.

Figure 6:
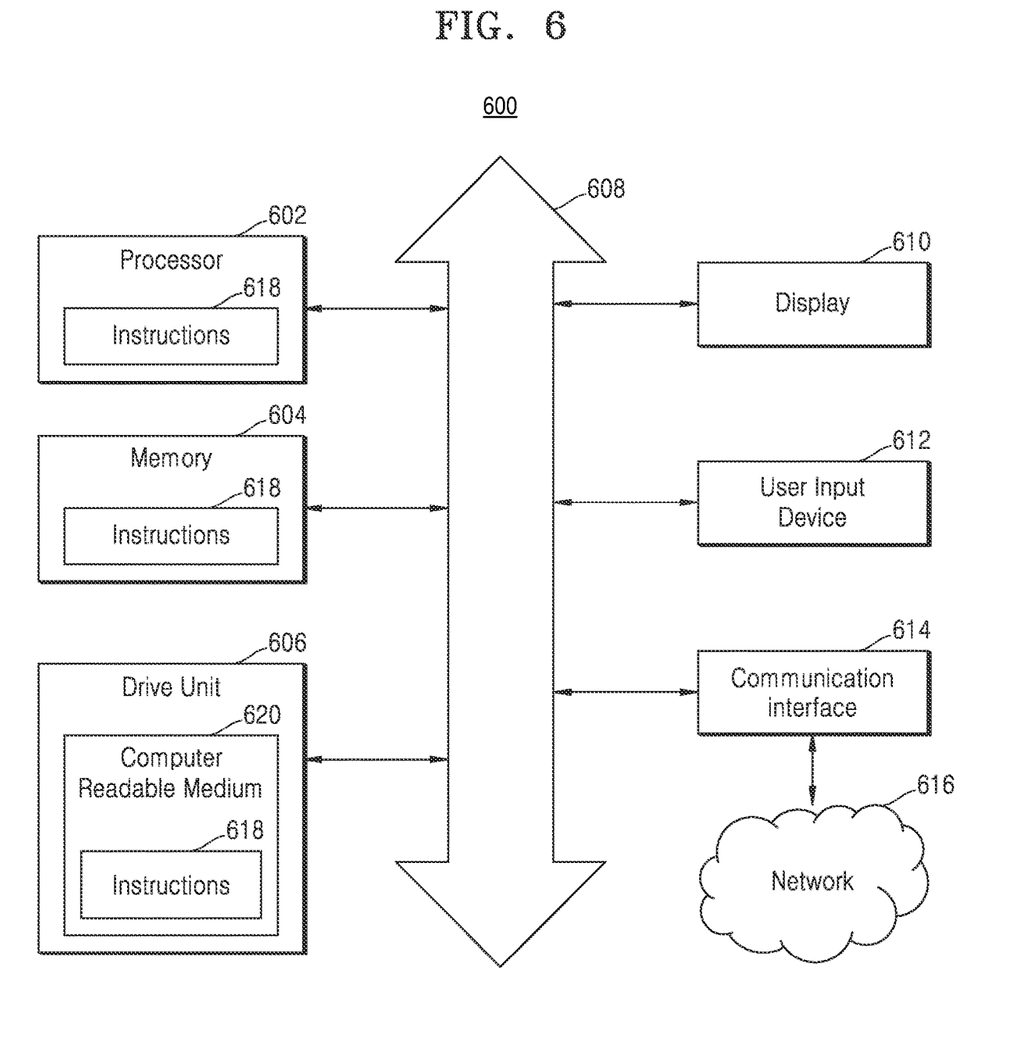
FIG. 6 illustrates an example hardware configuration of a system, according to an embodiment.

FIG. 6 illustrates an example hardware configuration of a system, according to an embodiment. Referring to FIG. 6, a computer system 600 can include a set of instructions that can be executed to cause the computer system 600 to perform any one or more of the methods disclosed. The computer system 600 may operate as a standalone device or may be connected, e.g., using a network, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

The computer system 600 may include a processor 602 e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application-specific integrated circuits, field-programmable gate arrays, servers, networks, digital circuits, analog circuits, combinations thereof, or other now-known or later developed devices for analyzing and processing data. The processor 602 may implement a software program, such as code generated manually (e.g., programmed).

The computer system 600 may include a memory 604, such as a memory 604 that can communicate via a bus 608. The memory 604 may include but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 604 includes a cache or random-access memory for the processor 602. In alternative examples, the memory 604 is separate from the processor 602, such as a cache memory of a processor, the system memory, or other memory. The memory 604 may be an external storage device or database for storing data. The memory 604 is operable to store instructions executable by the processor 602. The functions, acts, or tasks illustrated in the figures or described may be performed by the programmed processor 602 for executing the instructions stored in the memory 604. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

As shown, the computer system 600 may or may not further include a display unit 610, such as a liquid crystal display (LCD), an organic light-emitting diode (OLED), a flat panel display, a solid-state display, a projector, a printer or other now known or later developed display device for outputting determined information. The display 610 may act as an interface for the user to see the functioning of the processor 602, or specifically as an interface with the software stored in the memory 604 or the drive unit 606.

Additionally, the computer system 600 may include an input device 612 configured to allow a user to interact with any of the components of system 600. The computer system 600 may also include a disk or optical drive unit 606. The disk drive unit 606 may include a computer-readable medium 620 in which one or more sets of instructions 618, e.g., software, can be embedded. Further, instruction 618 may embody one or more of the methods or logic as described. In a particular example, the instruction 618 may reside completely, or at least partially, within the memory 604 or the processor 602 during execution by the computer system 600.

The disclosure contemplates a computer-readable medium that includes instructions 618 or receives and executes instructions 618 responsive to a propagated signal so that a device connected to a network 616 can communicate voice, video, audio, and images or any other data over the network 616. Further, instructions 618 may be transmitted or received over the network 616 via a communication port or interface 614 or using a bus 608. The communication port or interface 614 may be a part of the processor 602 or may be a separate component. The communication port 614 may be created in software or may be a physical connection in hardware. The communication port 614 may be configured to connect with a network 616, external media, the display 610, or any other components in system 600, or combinations thereof. The connection with the network 616 may be a physical connection, such as a wired Ethernet connection, or may be established wirelessly as discussed later. Likewise, the additional connections with other components of the system 600 may be physical or may be established wirelessly. The network 616 may alternatively be directly connected to bus 608.

The network 616 may include wired networks, wireless networks, Ethernet AVB networks, or combinations thereof. The wireless network may be a cellular telephone network, an 802.11, 802.16, 802.20, 802.1Q, or WiMax network. Further, the network 616 may be a public network, such as the Internet, a private network, such as an intranet, or combinations thereof, and may utilize a variety of networking protocols now available or later developed including, but not limited to TCP/IP-based networking protocols. The system is not limited to operation with any particular standards and protocols. For example, standards for Internet and other packet-switched network transmissions (e.g., TCP/IP, UDP/IP, HTML, and HTTP) may be used.

Various embodiments may be implemented or supported by one or more computer programs, which may be formed from computer-readable program code and embodied in a computer-readable medium. Herein, application and program refer to one or more computer programs, software components, instruction sets, procedures, functions, objects, class, instance, and related data, suitable for implementation in computer-readable program code. Computer-readable program code may include various types of computer code including source code, object code, and executable code. Computer-readable medium may refer to read only memory (ROM), RAM, hard disk drive (HDD), compact disc (CD), digital video disc (DVD), magnetic disk, optical disk, programmable logic device (PLD) or various types of memory, which may include various types of media that can be accessed by a computer.

In addition, the device-readable storage medium may be provided in the form of a non-transitory storage medium. The non-transitory storage medium is a tangible device and may exclude wired, wireless, optical, or other communication links that transmit temporary electrical or other signals. On the other hand, this non-transitory storage medium does not distinguish between a case in which data is semi-permanently stored in a storage medium and a case in which data is temporarily stored. For example, the non-transitory storage medium may include a buffer in which data is temporarily stored. Computer-readable media can be any available media that can be accessed by a computer and can include both volatile and nonvolatile media, removable and non-removable media. Computer-readable media includes media in which data can be permanently stored and media in which data can be stored and later overwritten, such as a rewritable optical disk or a removable memory device.

According to an embodiment, the method may be provided as included in a computer program product. Computer program products may be traded between sellers and buyers as commodities. The computer program product is distributed in the form of a machine-readable storage medium (e.g., CD-ROM), or is distributed between two user devices (e.g., smart phones) directly or through online (e.g., downloaded or uploaded) via an application store. In the case of online distribution, at least a portion of the computer program product (e.g., a downloadable app) may be temporarily stored or created in a device-readable storage medium, such as a memory of a manufacturer's server, a server of an application store, or a relay server.

According to an aspect of the disclosure, there is provided a method for performing an inference, the method may include detecting a context among at least one context associated with at least one application. The method may include triggering a model execution command to a smart agent of an electronic device, based on the detected context. The method may include loading a machine learning (ML) model into a secure storage of the electronic device, based on the detected context and the triggered model execution command. The method may include generating, using the loaded ML model, an inference, based on data associated with the detected context. The method may include sharing the generated inference with each application of the at least one application that is registered for the detected context.

Each of the at one context may correspond to pre-registered contexts.

The method may further include: mounting the secure storage before the loading of the ML model into the secure storage of the electronic device; and unmounting the secure storage after the generating the inference using the loaded ML model.

The sharing the generated inference with the at least one application may include: receiving at least one request for sharing the inference from the at least one application; validating the received at least one request for sharing the inference; and sharing the generated inference to the at least one application based on a result of the validating.

The validating the received at least one request for sharing the inference comprises validating the received at least one request for sharing the inference based on access rights of the at least one application with reference to a pre-registered validation policy.

The method may further include: converting the data associated with the detected context into a specific data type format and shape that are compatible with the ML model; and generating, using the loaded ML model, the inference using the converted data associated with the detected context.

The method may further include: fetching, an ML model corresponding to the ML model execution command from a secure cloud server, based on metadata associated with the ML model; and storing the fetched ML model in a secure database, wherein the metadata comprises a uniform resource identifier (URI) for identification of the fetched ML model.

The fetched ML model may be stored in the secure storage without encryption.

The secure storage may correspond to an isolated memory location that can be accessed via only the smart agent.

The generated inference may include contextual inference for a same set consisting of the ML model, events, and input data for which the at least one application is registered.

According to an aspect of the disclosure, there is provided an electronic device for performing an inference. The electronic device may include a smart agent, a secure storage, a memory storing at least one instruction, and at least one processor. The at least one processor is configured to execute the at least one instruction to detect a context among at least one context associated with at least one application. The at least one processor is configured to execute the at least one instruction to trigger a model execution command to the smart agent based on the detected context. The at least one processor is configured to execute the at least one instruction to load, by the smart agent a machine learning (ML) model into the secure storage based on the detected context and the triggered model execution command. The at least one processor is configured to execute the at least one instruction to generate, by the smart agent using the loaded ML model, an inference in the secure environment based on data associated with the detected context. The at least one processor is configured to execute the at least one instruction to share, by the smart agent, the generated inference with each of the at least one application that is registered for the detected context.

Each of the at one context may correspond to pre-registered contexts.

The at least one processor may be further configured to execute the at least one instruction to: mount the secure storage before the loading of the ML model into the secure storage of the electronic device; and unmount the secure storage after the generating the inference using the loaded ML model.

The at least one processor may be configured to execute the at least one instruction to: receive at least one request for sharing the inference from the at least one application; validate the received at least one request for sharing the inference; and share the generated inference to the at least one application based on a result of the validating.

The at least one processor may be configured to execute the at least one instruction to: validate the received at least one request for sharing the inference based on access rights of the at least one application with reference to a pre-registered validation policy.

The at least one processor may be configured to execute the at least one instruction to: convert the data associated with the detected context into a specific data type format and shape that are compatible with the ML model; and generate, using the loaded ML model, the inference using the converted data associated with the detected context.

The at least one processor may be further configured to execute the at least one instruction to: fetch, an ML model corresponding to the ML model execution command from a secure cloud server, based on metadata associated with the ML model; and store the fetched ML model in a secure database, wherein the metadata comprises a uniform resource identifier (URI) for identification of the fetched ML model.

The fetched ML model may be stored in the secure storage without encryption.

The secure storage may correspond to an isolated memory location that can be accessed via only the smart agent.

The generated inference may include contextual inference for a same set consisting of the ML model, events, and input data for which the at least one application is registered.

According to an aspect of the disclosure, a system for performing an inference task includes: an electronic device comprising a smart agent, a secure storage, a memory storing at least one instruction, and at least one processor; and a secure cloud server. The at least one processor is configured to execute the at least one instruction to: detect a context among at least one context associated with at least one application, trigger a model execution command to the smart agent based on the detected context, load a machine learning (ML) model into the secure storage of the electronic device based on the detected context and the triggered model execution command, generate, using the loaded ML model, an inference based on data associated with the detected context, and share the generated inference with each of the at least one application that is registered for the detected context.

According to an aspect of the disclosure, a system for performing an inference task includes: an electronic device comprising a smart agent, a secure storage, a memory storing at least one instruction, and at least one processor; and a secure cloud server. The at least one processor is configured to execute the at least one instruction to: detect a context among at least one context associated with at least one application, trigger a model execution command to the smart agent based on the detected context, load a machine learning (ML) model into the secure storage of the electronic device based on the detected context and the triggered model execution command, generate, using the loaded ML model, an inference based on data associated with the detected context, and share the generated inference with each of the at least one application that is registered for the detected context.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. A method for performing an inference, the method comprising:
   detecting a context among at least one context associated with at least one application;
   triggering, based on the detected context, a model execution command to a smart agent of a device;

mounting, by the smart agent, a secure storage, wherein during the mounting, a policy is applied to the secure storage such that access to the secure storage is restricted to the smart agent;

loading, by the smart agent after the secure storage is mounted, a machine learning (ML) model into the secure storage of the device based on the detected context and the triggered model execution command;

generating, using the loaded ML model, the inference, based on data associated with the detected context;

unmounting, by the smart agent, the secure storage after the generating the inference using the loaded ML model; and sharing the generated inference with each application of the at least one application that is registered for the detected context.

2. The method of claim 1, wherein each of the at least one context corresponds to a pre-registered context.

3. The method of claim 1, wherein the sharing the generated inference with the at least one application comprises:

receiving at least one request for sharing the inference from the at least one application;

validating the received at least one request for sharing the inference; and sharing the generated inference to the at least one application based on a result of the validating.

4. The method of claim 3, wherein the validating the received at least one request for sharing the inference comprises validating the received at least one request for sharing the inference based on access rights of the at least one application with reference to a pre-registered validation policy.

5. The method of claim 1, further comprising:

converting the data associated with the detected context into a specific data type format and shape that are compatible with the ML model; and generating using the loaded ML model, the inference using the converted data associated with the detected context.

6. The method of claim 1, further comprising:

fetching an ML model corresponding to the model execution command from a secure cloud server, based on metadata associated with the ML model; and storing the fetched ML model in a secure database, wherein the metadata comprises a uniform resource identifier (URI) for identification of the fetched ML model.

7. The method of claim 6, wherein the fetched ML model is stored in the secure storage without encryption.

8. The method of claim 1, wherein the secure storage is located in an isolated memory location that can be accessed via only the smart agent.

9. The method of claim 1, wherein the generated inference comprises contextual inference for a same set consisting of the ML model, events, and input data for which the at least one application is registered.

10. An electronic device for performing an inference, the electronic device comprising:

a smart agent;

a secure storage;

a memory storing at least one instruction; and at least one processor;

wherein the at least one processor is configured to execute the at least one instruction to:

detect a context among at least one context associated with at least one application executing on the electronic device, trigger based on the detected context, a model execution command to the smart agent based on the detected context, mount, by the smart agent, a secure storage, wherein during the mounting, a policy is applied to the secure storage such that access to the secure storage is restricted to the smart agent;

load, by the smart agent after the secure storage is mounted, a machine learning (ML) model into the secure storage of the electronic device based on the detected context and the triggered model execution command, generate, by the smart agent using the loaded ML model, the inference based on data associated with the detected context, unmount, by the smart agent, the secure storage after the generating the inference using the loaded ML model, and share, by the smart agent, the generated inference with each of the at least one application that is registered for the detected context.

11. The electronic device of claim 10, wherein the at least one processor is further configured to execute the at least one instruction to:

receive, by the smart agent, at least one request for sharing the inference from the at least one application;

validate, by the smart agent, the received at least one request for sharing the inference; and share, by the smart agent, the generated inference to the at least one application based on a result of the validation.

12. The electronic device of claim 11, wherein the at least one processor is further configured to execute the at least one instruction to validate the received at least one request based on access rights of the at least one or application with reference to a pre-registered validation policy.

13. The electronic device of claim 10, wherein the at least one processor is further configured to execute the at least one instruction to:

convert, by the smart agent, the data associated with the detected context into a specific data type format and shape that are compatible with the ML model to be loaded; and generate, by the smart agent, using the loaded ML model, the inference based on the conversion of the data associated with the detected context.

14. The electronic device of claim 10, wherein the at least one processor is further configured to execute the at least one instruction to:

fetch, by the smart agent, an ML model corresponding to the model execution command from a secure cloud server, based on metadata associated with the ML model; and store, by the smart agent, the fetched ML model in the secure storage, wherein the metadata comprises a uniform resource identifier (URI) for identification of the fetched ML model.

15. The electronic device of claim 14, wherein the fetched ML model is stored in the secure storage without encryption.

16. The electronic device of claim 10, wherein the secure storage is located in to an isolated memory location that can be accessed via only the smart agent.

17. The electronic device of claim 10, wherein the generated inference includes contextual inference for a same set consisting of the ML model, events, and input data for which the at least one application is registered.

18. A non-transitory computer-readable storage medium storing at least one instruction which, when executed by at least one processor of an electronic device, causes the at least one processor to execute a method including:
- detecting a context among at least one context associated with at least one application;
- triggering, based on the detected context, a model execution command to a smart agent of the electronic device, based on the detected context;
- mounting, by the smart agent, a secure storage, wherein during the mounting, a policy is applied to the secure storage such that access to the secure storage is restricted to the smart agent;
- loading, by the smart agent after the secure storage is mounted, a machine learning (ML) model into the secure storage of the electronic device based on the detected context and the triggered model execution command;
- generating, using the loaded ML model, an inference, based on data associated with the detected context;
- unmounting, by the smart agent, the secure storage after the generating the inference using the loaded ML model; and
- sharing the generated inference with each application of the at least one application that is registered for the detected context.

* * * * *